(12) United States Patent
Slagel et al.

(10) Patent No.: US 7,823,338 B2
(45) Date of Patent: Nov. 2, 2010

(54) MODULAR ACCESS CONTROL SYSTEM

(75) Inventors: David Slagel, Flatwoods, KY (US); Robert Slagel, Ironton, OH (US)

(73) Assignee: Modular Security Systems, Inc., Ironton, OH (US)

( * ) Notice: Subject to any disclaimer, the term of this patent is extended or adjusted under 35 U.S.C. 154(b) by 248 days.

(21) Appl. No.: 11/733,464

(22) Filed: Apr. 10, 2007

(65) Prior Publication Data

US 2008/0250726 A1    Oct. 16, 2008

(51) Int. Cl.
*E04H 1/00* (2006.01)
*E04H 3/04* (2006.01)

(52) U.S. Cl. ............................................ 52/79.1; 52/33

(58) Field of Classification Search .............. 52/79.1, 52/33, 106, 174; 49/46
See application file for complete search history.

(56) References Cited

U.S. PATENT DOCUMENTS

| | | | |
|---|---|---|---|
| 3,482,037 A | 12/1969 | Brown et al. | |
| 3,492,767 A | 2/1970 | Pincus | |
| 4,308,803 A | 1/1982 | Pretini | |
| 4,385,469 A | 5/1983 | Scheuerpflug et al. | |
| 4,481,887 A | 11/1984 | Urbano | |
| 4,513,545 A | 4/1985 | Hopkins, Jr. | |
| 4,586,441 A | 5/1986 | Zekich | |
| 4,656,954 A | 4/1987 | Tonali | |
| 4,683,688 A | 8/1987 | Wojcinski | |
| 5,353,558 A | 10/1994 | Shea, Sr. et al. | |
| 5,579,613 A | 12/1996 | Carr | |
| 5,617,674 A * | 4/1997 | Terrill | 49/55 |
| 5,676,271 A * | 10/1997 | Reynard | 220/1.5 |
| 5,704,163 A * | 1/1998 | Kocznar | 49/47 |
| 5,706,614 A | 1/1998 | Wiley et al. | |
| 5,727,352 A | 3/1998 | Bared et al. | |

(Continued)

FOREIGN PATENT DOCUMENTS

BE    1009435    3/1997

(Continued)

OTHER PUBLICATIONS

International Search Report issued in counterpart International Application No. PCT/US2008/056503, mailed Jul. 15, 2008.

(Continued)

*Primary Examiner*—Richard E Chilcot, Jr.
*Assistant Examiner*—Andrew J Triggs
(74) *Attorney, Agent, or Firm*—DLA Piper LLP US

(57) ABSTRACT

An access control system includes first and second portable containers. The first portable container comprises a first sidewall opening and the second portable container comprises a second sidewall opening. The portable containers are arranged such that the first sidewall opening in the first portable container communicates with the second sidewall opening in the second portable container. The first portable container comprises a passing room disposed in the first portable container. The passing room includes a barrier device located in the walkway defining a first space between a first passing room opening and the barrier device, and a second space between the barrier device and a second passing room opening. The access control system is constructed such that when the access control system is disposed between a first area and an enclosed second area ingress and egress from and to the second area is controlled by the access control system.

28 Claims, 13 Drawing Sheets

U.S. PATENT DOCUMENTS

| | | | |
|---|---|---|---|
| 5,735,639 A * | 4/1998 | Payne et al. | 405/129.57 |
| 5,983,578 A | 11/1999 | Huttie et al. | |
| 6,102,228 A * | 8/2000 | Rene | 220/1.5 |
| 6,155,747 A * | 12/2000 | Payne et al. | 405/129.55 |
| 6,170,194 B1 * | 1/2001 | Kocznar et al. | 49/46 |
| 6,205,200 B1 | 3/2001 | Boyer et al. | |
| 6,299,008 B1 * | 10/2001 | Payne | 220/1.5 |
| 6,513,670 B2 * | 2/2003 | Minkkinen | 220/1.5 |
| 6,610,977 B2 | 8/2003 | Megerle | |
| 6,724,304 B2 | 4/2004 | Risi | |
| 6,742,301 B1 | 6/2004 | Schwarz | |
| 6,745,520 B2 | 6/2004 | Puskaric et al. | |
| 6,929,175 B2 * | 8/2005 | Stockhammer et al. | 235/379 |
| 6,972,693 B2 | 12/2005 | Brown et al. | |
| 6,973,758 B2 * | 12/2005 | Zeik et al. | 52/561 |
| 6,983,567 B2 | 1/2006 | Ciotti | |
| 7,023,339 B2 | 4/2006 | Stomski | |
| 7,102,512 B2 * | 9/2006 | Pendergraft | 340/540 |
| 7,119,682 B1 | 10/2006 | Fisher | |
| 2004/0232054 A1 | 11/2004 | Brown et al. | |
| 2005/0074086 A1 * | 4/2005 | Pendergraft | 378/6 |
| 2006/0107614 A1 * | 5/2006 | Slagel | 52/750 |
| 2006/0150872 A1 | 7/2006 | Mesinger | |
| 2008/0250726 A1 * | 10/2008 | Slagel et al. | 52/79.8 |

FOREIGN PATENT DOCUMENTS

| | | |
|---|---|---|
| CA | 2 303 611 | 10/2000 |
| DE | 203 16 067 | 4/2004 |
| DE | 10 2004 048 403 | 4/2006 |
| DE | 20 2008 002 754 | 8/2008 |
| EP | 0 008 271 | 2/1980 |
| EP | 0 143 494 | 6/1985 |
| EP | 0 940 775 | 9/1999 |
| EP | 1 557 527 | 7/2005 |
| ES | 2 049 596 | 4/1994 |
| ES | 2 068 052 | 4/1995 |
| FR | 2 489 404 | 3/1982 |
| FR | 2 646 456 | 11/1990 |
| FR | 2 808 048 | 10/2001 |
| GB | 2 041 053 | 9/1980 |
| GB | 1 589 510 | 5/1981 |
| GB | 1 600 858 | 10/1981 |
| GB | 2 146 053 | 4/1985 |
| GB | 2 249 574 | 5/1992 |
| GB | 2 264 470 | 9/1993 |
| GB | 2 408 127 | 5/2005 |
| GB | 2 440 937 | 2/2008 |
| NL | 7 308 642 | 12/1974 |
| NL | 9301809 | 5/1995 |
| RU | 2 247 821 | 12/2003 |
| WO | WO 94/05879 | 3/1994 |
| WO | WO 96/30601 | 10/1996 |
| WO | WO 00/78129 | 12/2000 |
| WO | WO 2006/055078 | 5/2006 |

OTHER PUBLICATIONS

Written Opinion Issued in counterpart International Application No. PCT/US2008/056503, mailed Jul. 15, 2008.
www.smithsdetection.com; press release "Smiths Detection unveils innovative mobile security checkpoint for screening individuals and personal items"; Wiesbaden, Germany, Mar. 2, 2005.
www.smithsdetection.com; press release "Smiths Detection Creates First Mobile Security Screening Checkpoint in Partnership With TSWG and TSA Pine Brook, N.J.", Pine Brook, N.J., Apr. 3, 2006.
www.wolfcoach.com; "Mobile Perimeter Checkpoint" brochure from L3 Communications (Wolf Coach) company's website; Apr. 2007.
www.miframsecurity.com/e/check_post.html; "Protected Screening Module" from Mifram Security Company's website, Apr. 7, 2005.
http://web.archive.org/web/*hh_/www.miframsecurity.com/e/check_post.asp; "Way Back Machine"; an internet archive.
Employees' Compensation Case No. 699 of 2005, in the District Court of the Hong Kong Special Administration Region, Oct. 5, 2006.
www.ascontainers.co.za/services.htm; A.S. Containers cc., 2007.
Brijot Imaging Systems, Inc., press release "Brijot Delivers First ScanPort™ Production Order To U.S. Army For Deployment In Middle East"; Orlando, Fla., May 20, 2008.
U.S. Appl. No. 11/733,464, filed Apr. 1, 2007, Slagel.
Office Action issued on Jul. 13, 2007, in related U.S. Appl. No. 10/992,126.
Notice of Allowance issued in U.S. Appl. No. 10/992,126 mailed Sep. 3, 2008.
English language translation of NL 9 301 809, published May 16, 1995.
English language abstract of ES 2 068 052, published Apr. 1, 1995.
English language abstract of ES 2 049 596, published Apr. 16, 1994.
English language abstract of DE 10 2004 048 403, published Apr. 6, 2006.
English language abstract of FR 2 489 404, published Mar. 5, 1982.
English language abstract of RU 2 247 821, published Dec. 10, 2003.
English language abstract of EP 0 940 775, published Sep. 8, 1999.
English language abstract of FR 2 645 456, published Nov. 2, 1990.
English language abstract of DE 203 16 067, published Apr. 1, 2004.
English language abstract of FR 2 808 048, published Oct. 26, 2001.
English language abstract of BE 1 009 435, published Mar. 4, 1997.
Letter dated Dec. 16, 2008, from Haseltine Lake, including analysis of current claim of counterpart EP 1 812 666.
English language abstract of EP 1557527, published Jul. 27, 2005.
English language abstract of EP 0008271, published Feb. 20, 1980.
Office Action issued in U.S. Appl. No. 10/992,126 mailed Apr. 28, 2009.
Office Action issued in U.S. Appl. No. 12/274,777 mailed Aug. 27, 2009.
International Preliminary Report on Patentability (IPRP) issued in PCT/US2008/056503 on Oct. 22, 2009.
USPTO Image File Wrapper of relate U.S. Appl. No. 10/992,126 captured May 19, 2010.

* cited by examiner

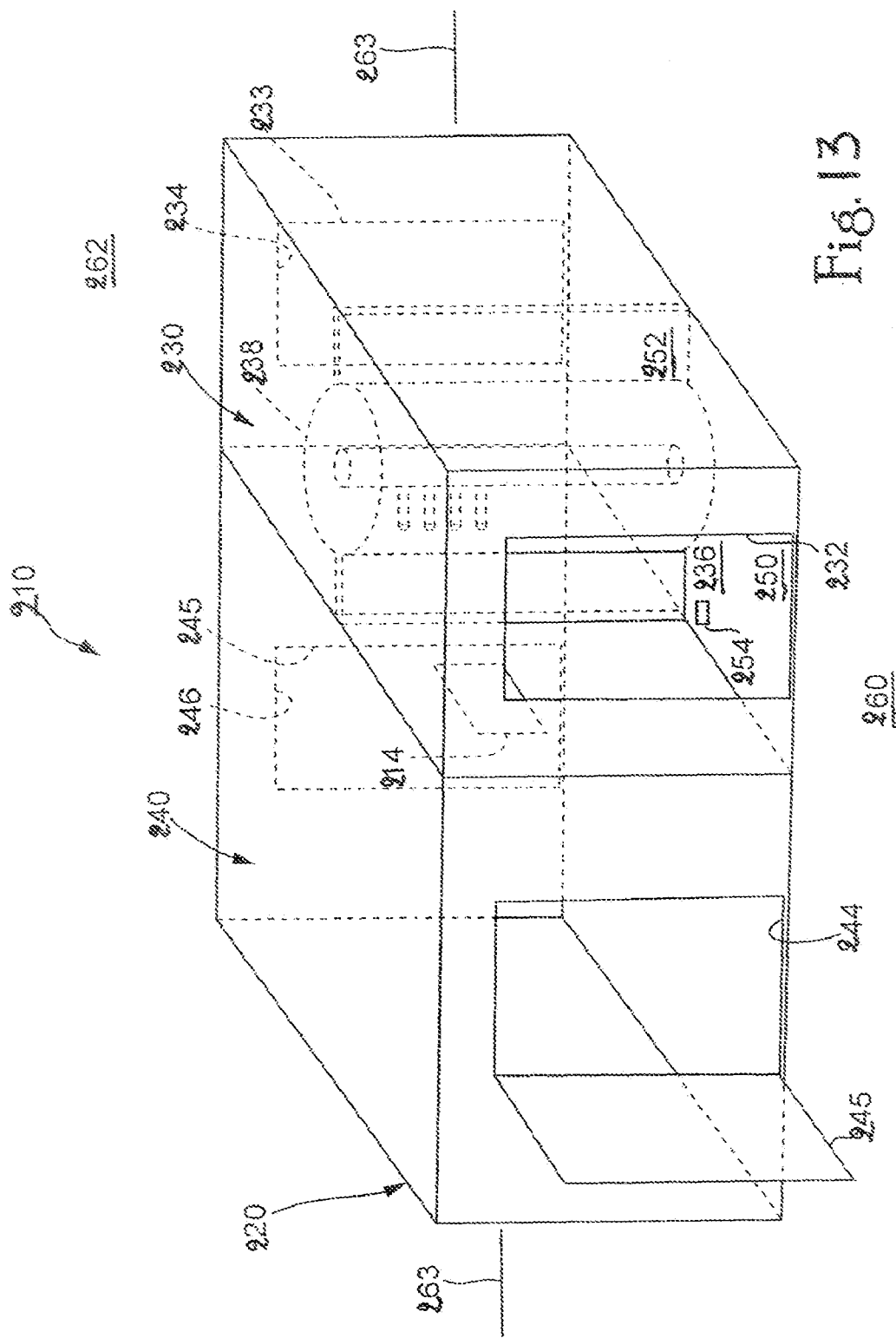

US 7,823,338 B2

MODULAR ACCESS CONTROL SYSTEM

RELATED APPLICATIONS

The present application is related to U.S. patent application Ser. No. 10/992,126 filed on Nov. 19, 2004, the contents of which are incorporated herein by reference.

FIELD OF THE INVENTION

The present invention is directed generally to access control systems and specifically to portable access control systems.

BRIEF DESCRIPTION OF THE DRAWINGS

FIG. 13 illustrates a perspective view of a passing room and a control room, according to one embodiment of the invention.

DESCRIPTION OF EMBODIMENTS OF THE INVENTION

Figure 1:
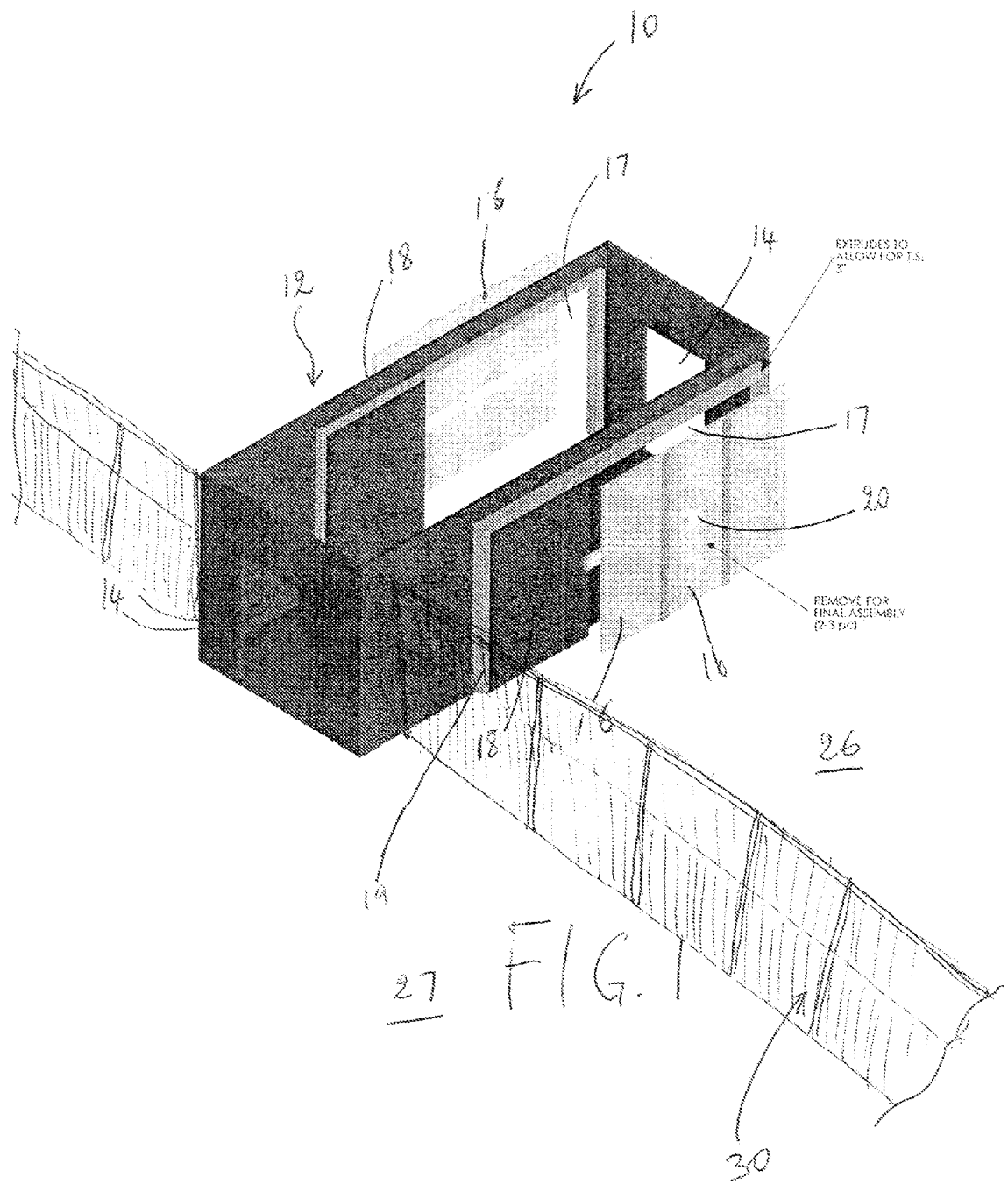
FIG. 1 shows a perspective view of an access control system comprising a portable container, according to an embodiment of the present invention.

FIG. 1 shows a perspective view of a portable container 10, according to an embodiment of the invention. The portable container 10 has a housing 12, which, in one embodiment, is rectangular shaped. However, any other shape is also possible. The housing 12 can be made of a durable material (e.g., iron, aluminum, stainless steel, wood, reinforced plastics) or a combination of various materials. In one embodiment, the portable container 10 can be made, for example, from corrugated steel and may include marine grade plywood flooring. The portable container 10 can also be made to withstand repeated lifting and placing. The portable container 10 can be configured to hold a cargo as large as 30 tons. The portable container 10 can be equipped to be securely towed by a vehicle. For example, one or both ends of the portable container 10 can be equipped with hooks, links or the like to be towed by a vehicle. The portable container 10 can also be provided with forklift pockets, corner connectors or other types of attachments as may be useful for the transport or the anchorage of the portable container 10. In addition, a security system to ensure that only authorized vehicles move the portable container 10 can also be included.

In one embodiment, the portable container 10 can be delivered to a user in a ready-made or turn-key state. In this case, if electricity is not required, the portable container 10 is ready to be used. If electricity is required, all that needs to be done to render the portable container 10 usable is the provision of electricity. In another embodiment, the portable container 10 can be customized by the user to meet specific needs of the user.

The portable container 10 can be a standard shipping container. In one embodiment, the standard shipping container can be a shipping container which complies with international standards as determined by the International Organization for Standardization (ISO). The dimensions of a standard shipping container as defined by the ISO body can be, for example, 40 feet, 20 feet, or 10 feet long by 8 feet wide by 8.5 feet high.

The portable container 10 may also be provided with one or more openings 14 to allow entry and exit of persons, as will be explained in detail the following paragraphs. In addition, one or more lockable accessible panels or doors 16 may also be provided on one or more openings 17 in one or both sidewalls 18 of the portable container 10. In one embodiment, the opening 17 is a 9 feet wide by 7 feet high opening. However, the opening 17 can have any dimension, as desired. The opening 17 can be framed or reinforced with a framing material 19. The framing material 19 can be any suitable material for framing structures including wood. metal, plastic or a composite material. The framing can be made for example of rectangular tubing or other suitable structure. The framing material 19 is used for structural reinforcement around the opening 17 as well as a joining material for joining two portable containers together. Specifically, when two containers 10 each having an opening 17 are brought together such that the openings 17 are communicating, the framing material 19 on one container 10 would abut against a wall of another container 10 to form a container-to-container interface seal. In one embodiment, the framing 19 may be provided with a flexible material (e.g., a sponge material) such that when the container 10 presses against the other adjacent container 10, the flexible material would be compressed and act as a gasket to create an atmosphere tight seal including a watertight seal.

Figure 2:
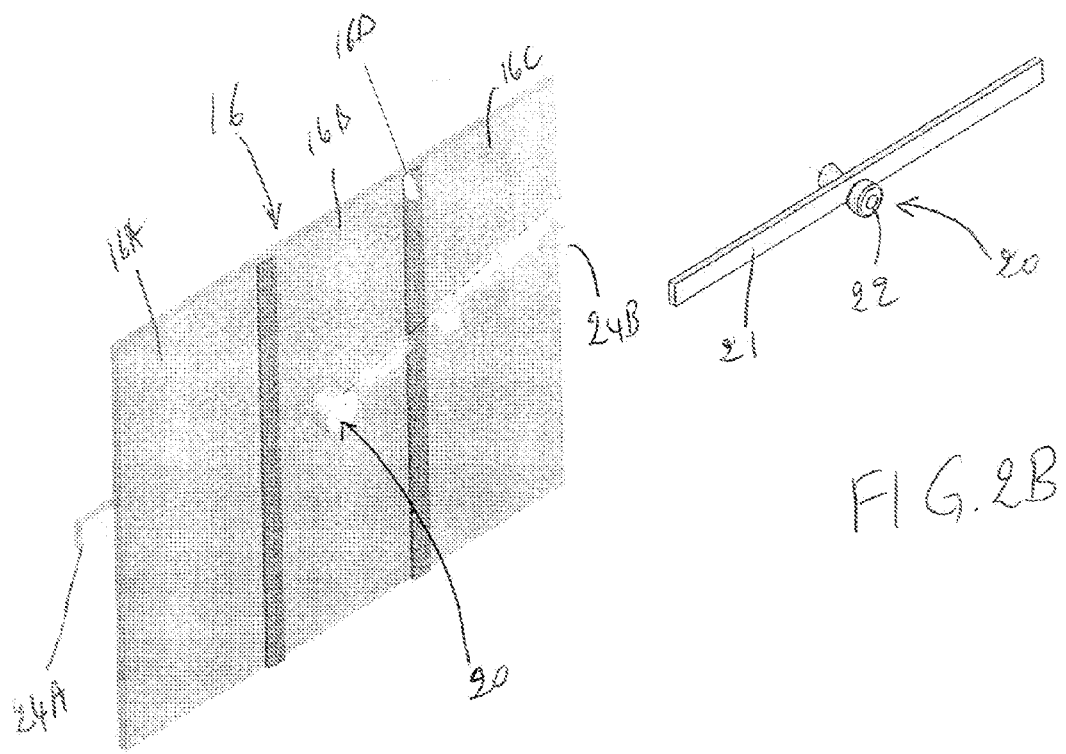
FIG. 2A shows an accessible panel along with a locking mechanism used in the portable container depicted in FIG. 1, according to one embodiment of the present invention.
FIG. 2B shows a bar-like locking mechanism for locking the accessible panel depicted in FIG. 2A, according to one embodiment of the present invention.

In one embodiment, the lockable accessible panel 16 comprises three panel-sections 16A, 16B and 16C (see FIG. 2A). The three panels section 16,A, 16B and 16C are joined together using strips of material 16D by fastening each strip 16D onto two adjacent panel sections. In this way, for example, the foot-print of the lockable accessible panel 16 is rendered smaller so as to occupy a small space for storage while expandable when needed to close the opening 17.

The lockable accessible panel 16 can be mounted on the sidewall 18 using one or more locking mechanisms 20. The locking mechanism 20 can be any type of locking mechanism. In one embodiment, the locking mechanism 20 can be a plurality of locks provided on a periphery of the accessible panel 16 so as to attach the panel 16 to the sidewall 18. In another embodiment, the locking mechanism 20 comprises a bar-like locking mechanism 21 and a movable center-lock 22 provided in the center of the bar-like locking mechanism 21 as depicted in FIGS. 2A and 2B. The movable center-lock 22 latches the bar-like locking mechanism 21 to the accessible panel 16. In one embodiment, the bar-like locking mechanism 21 is rotatable by the movable center-lock 22 so as to allow the extremities 24A and 24B of the bar-like locking mechanism 21 to slide behind the sidewall 18 and latch onto the sidewall 18. In another embodiment, the bar-like locking mechanism 21 is fastened to the accessible panel 16 using the center-lock 22 (e.g., a bolt and a nut) so as to bring the extremities 24A and 24B of the bar-like locking mechanism against a lip or an edge of the sidewall 18 (shown in FIG. 1).

Figure 3:
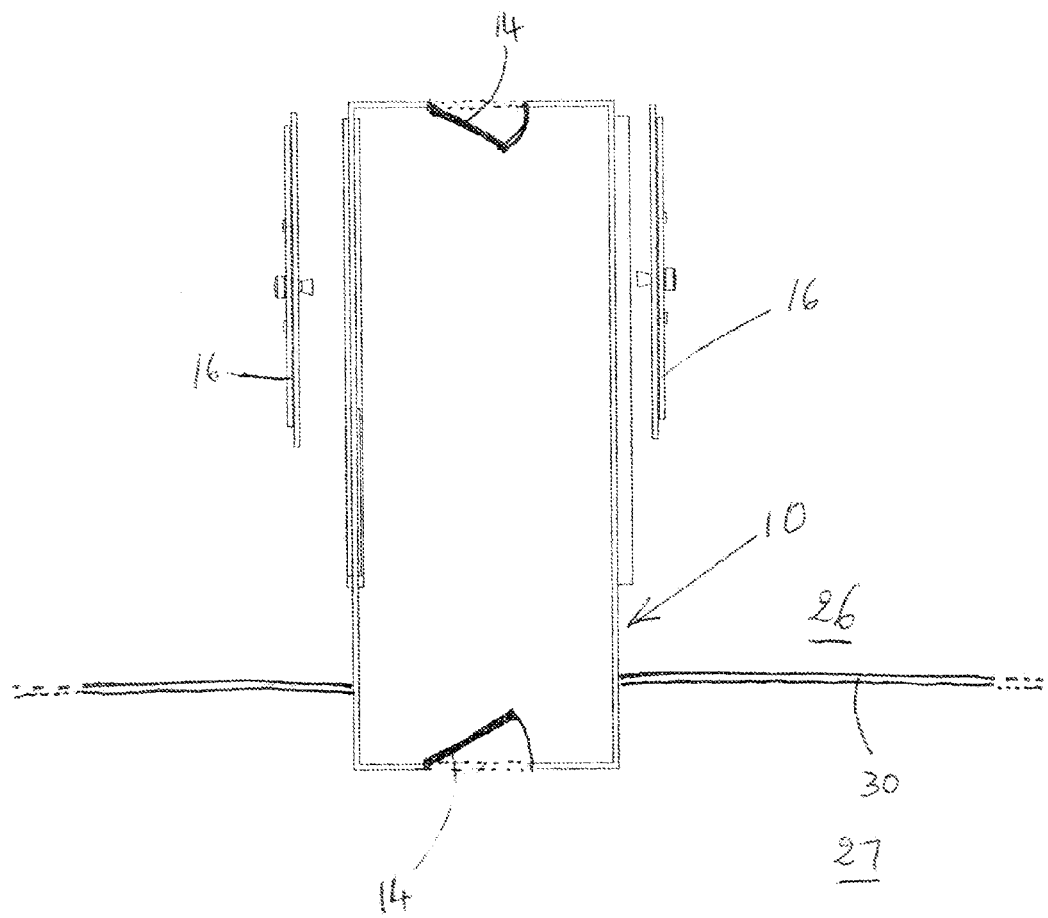
FIG. 3 depicts a floor plan of the portable container shown in FIG. 1, according to an embodiment of the present invention.

When the one or more openings 17 in the portable container 10 are closed with the accessible panels 16, the portable container 10 can be used as a stand-alone access control unit to control ingress or egress from and to a first area (e.g., secured area) 26 delimited by a fencing material 30, through openings 14. In this case, the fencing 30 or other material may be attached to the portable container 10. For example, the fencing 30 can be attached to the sidewalls 18 of the portable container 10 so as to surround the secured area 26, as depicted in FIG. 1 and FIG. 3. Therefore, the fencing 30 separates a second area (e.g., a non-secured area) 27 from die first area (secured area) 26. In order to enter into the secured area 26 or exit from the secured area 26 an individual or individuals must pass through the openings 14 of the portable container 10. Although, the first area 26 is described herein as being the secured area and the second area 27 is described as being the non-secured area, it must be appreciated that the fencing 30 can also be arranged such that the first area 26 is the non-secured area and the second area 27 is the secured area. Furthermore, other features, such as natural barriers (e.g., bodies of water, ridges, etc.) or other barriers (e.g., walls, etc.) may be employed to separate the first area 26 from the second area 27.

In order to provide for a larger space in the access control system, so as to accommodate, for example, various devices or create spaces dedicated to specific functions in the access control system, two or more portable containers 10 may be connected to each other to form the access control system. In this case, the one or more openings 17 in the one or more portable containers 10 may be opened by removing the accessible panels 16 and the portable containers 10 are placed adjacent to each other so as to allow communication between the portable containers 10 through the one or more openings 17.

Figure 4:
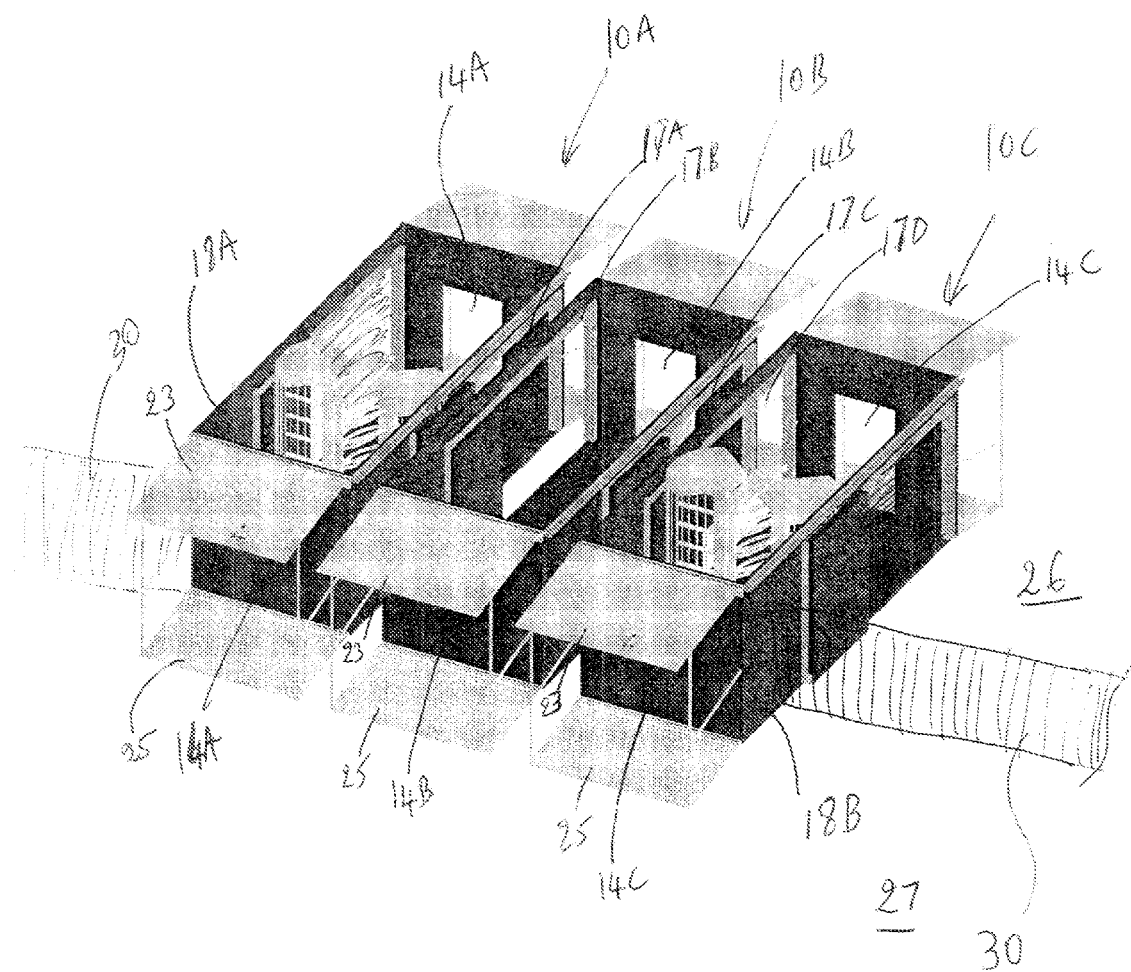
FIG. 4 snows a perspective view of an access control system including three portable containers, according to an embodiment of the present invention.
Figure 5:
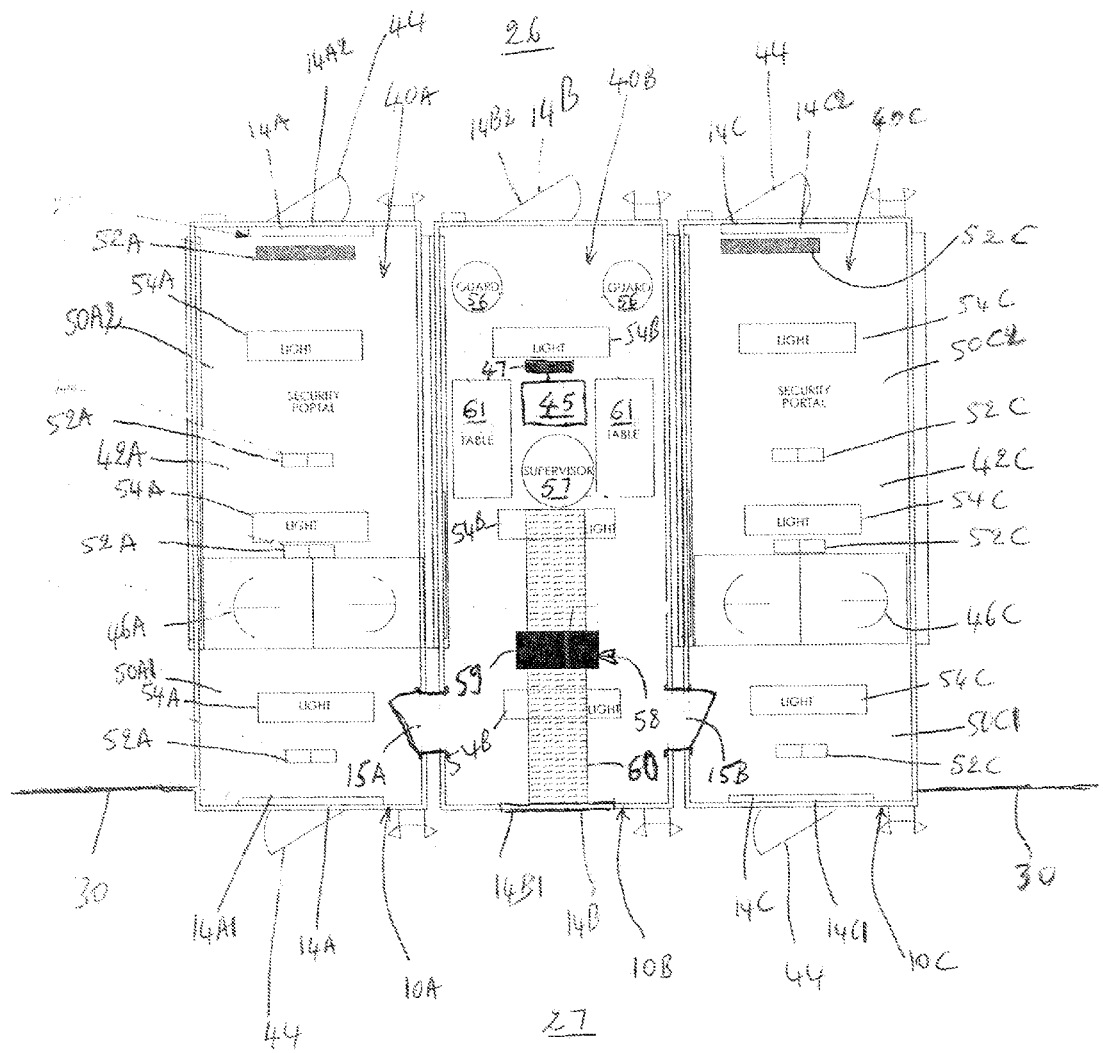
FIG. 5 is floor plan of the access control system depicted in FIG. 4 showing some details about the features included in the access control system, according to an embodiment of the present invention.

As shown in FIGS. 4 and 5 three portable containers 10A, 10B and 10C can be juxtaposed next to each other. In this case, for example, opening 17A in portable container 10A is opened by removing an accessible panel (not shown) provided in a sidewall of the portable container 10A, openings 17B and 17C in portable container 10B are opened by removing accessible panels (not shown) provided in each of the sidewalls of the portable container 10B, and opening 17D is opened by removing an accessible panel (not shown) provided in a sidewall of the portable container 10C. The portable containers 10A, 10B and 10C are arranged such that opening 17A communicates with opening 17B and opening 17C communicates with opening 17D.

Figure 6:
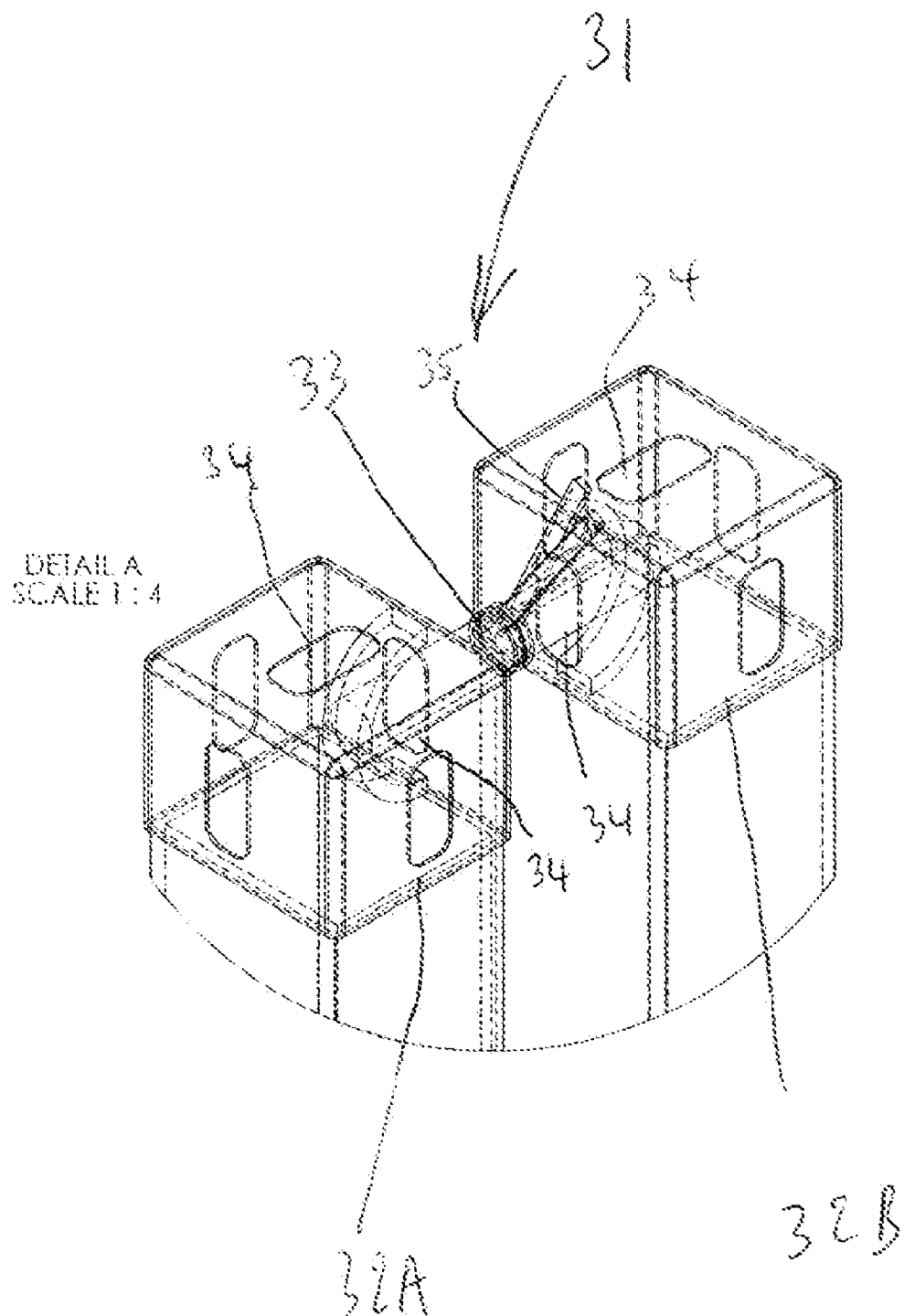
FIG. 6 is a three-dimensional view of an anchoring system for anchoring two or more portable containers together, according to an embodiment of the present invention.

In one embodiment, one or more anchoring device 31, shown in FIG. 6, can be used to attach the portable container 10A to adjacent portable container 10B and can be used to attach portable container 10B to adjacent portable container 10C. The anchoring device 31 is used to anchor the portable containers 10A, 10B and 10C to each other. In one embodiment, the anchoring device 31 comprises two links 32A and 32B and a ratcheting device 33 linked to the two links 32A and 32B. The link 32 A is fastened to a sidewall of one of the portable containers 10A, 10B, 10C (e.g., portable container 10A) and the link 32B is fastened to a sidewall of another portable container (e.g., portable container 10B). lire links 32A and 32B include one or more holes 34 through which the ratcheting device 33 can be connected to the links 32A and 32B. The ratcheting device 33 has one or more levers 35 which when pivoted back and forth allow the ratcheting device to bring the two links 32A and 32B closer to each other and hence bring the two portable containers 10A and 10B closer to each other.

The space in each of the portable containers 10A, 10B and 10C can be tailored for a specific need. For example, the spaces in the portable containers 10A and 10C can be used as passing rooms for individual to access a first area (e.g., a secured area) 26 delimited by the fencing material 30 from a second area (e.g., non-secured area) 27. The space in portable container 10B can be used as a control room in which one or more guards or supervisors may be located to control the movement of people through the passing rooms in the portable containers 10A and 10C. However, although FIGS. 4 and 5 show a configuration in which a container configured as a control room (container 10B) being disposed between two containers configured as passing rooms (containers 10A and 10C), other configurations are also possible. For example, two or more containers configured as passing rooms can be disposed next to each other (e.g., the container 10A can be disposed adjacent to container 10C). In which case, a container configured as a control room (e.g., container 10B) can be disposed next to one of the two or more containers configured as passing rooms (e.g., disposed next to container 10A or next to container 10C). Alternatively, the arrangement need not include the control room. Furthermore, the architecture of the access control system being modifiable and flexible, any arrangement of any one or more containers configured as passing rooms and any one or more containers configured as control rooms is within the scope of the present invention.

Similarly to the embodiment depicted in FIG. 1, the juxtaposed portable containers 10A, 10B and 10C can be used as an access control system to control ingress or egress from and to the first area (secured area) 26 delimited by the fencing material 30. In this embodiment, however, the fencing 30 or other material may be attached to sidewall 18A of the portable container 10A and to sidewall 18B of the portable container 10C, to surround the secured area 26, as depicted in FIG. 4. In order to enter into the first area (e.g., the secured area) 26 from the second area (the non-secured area) 27 or exit from the first area (secured area) 26, an individual or individuals must necessarily pass through openings 14A of the portable container 10A or pass through openings 14C of the portable container 10C. Optionally, openings 14B can also be provided in the portable container 10B to allow separate entry into or exit, from the control room of the access control device for the one or more guards or supervisors. However, the guards or supervisors can also enter into the control room in the portable container 10B through any one of openings 14A and openings 14C by passing through the opening (17A, 17B) or by passing through the opening (17C, 17D).

As stated in the above paragraphs, one or more portable containers, for example portable containers 10A and 10C, can be used as passing rooms to allow controlled movement of individuals into and out of the first area (the secured area) 26. Hence, in one embodiment, as depicted in a floor plan of the control device shown in FIG. 5, the containers 10A and 10C comprise passing rooms 40A and 40C, respectively. The passing rooms 40A and 40C control the movement of people between the first area (the secured area) 26 and the second area (the non-secured area) 27.

The passing room 40A communicates with the first area (the secured area) 26 and the second area (the non-secured area) 27 through doors 14A. Specifically, the passing room 40A communicates with the second area (non-secured area) 27 via a first opening 14A1 and communicates with the first area (the secured area) 26 via a second opening 14A2. The passing room 40C communicates with the first area (the secured area) 26 and the second area (the non-secured area) 27 through doors 14C. Specifically, the passing room 40C communicates with the second area (the non-secured area) 27 via a first opening 14C1 and communicates with the first area (the secured area) 26 via a second opening 14C2. The first opening 14A1 is spaced apart from the second opening 14A2, in the passing room 40A, so as to define a walkway 42A in-between. Similarly, the first opening 14C1 is spaced apart from the second opening 14C2, in the passing room 40C, so as to define a walkway 42C in-between. A closing device 44 (e.g., a door, shutters or the like) may be employed to close the openings 14A1, 14A2, 14C1 and 14C2 when either or both passing rooms 40A and 40C are not in use. A security sensing device for safeguarding the closing device 44 can be employed.

The portable container 10A can comprise at least one barrier device 46A and the portable container 10C can comprise at least one barrier device 46C. The barrier device 46A can be arranged inside of the passing room 40A so as to restrict a person's movement through the passing room 40A. The barrier device 46C can be arranged inside of the passing room 40C so as to restrict a person's movement through the passing room 40C. In one embodiment, a turnstile (e.g., a full-body turnstile, a partial-body turnstile, a bi-directional turnstile, or a uni-directional turnstile) is employed as a barrier device 46A, 46C of the portable containers 10A, 10B, respectively. However, other barrier devices may be used to restrict a person's movement through the passing room 42A, 42C. For example, a sliding door, a revolving door, moving bars, and gates, or the like may be used as a barrier device 46A, 46C. The barrier device 46A is located inside the walkway 42A, defining a first space 50A1 between the barrier device 46A and the first opening 14A1, and defining a second space 50A2 between the barrier device 46A and the second opening 14A2. Similarly, the barrier device 46C is located inside the walkway 42C, defining a first space 50C1 between the barrier device 46C and the first opening 14C1, and defining a second space 50C2 between the barrier device 46A and the second opening 14C2.

In one embodiment, the passing room 40A, 40C can include one or more security devices 52A, 52C issuing permission for a person to pass through the passing room 42A, 42B, respectively. In one embodiment, the security device 52A, 52C can comprise, but is not limited to, one or more card readers, one or more metal detectors (such as a magnetometer or the like), one or more weapon detectors, one or more x-ray scanners, one or more radiofrequency scanners (e.g., shortwave scanners), one or more biometric readers, one or more iris scanners, one or more fingerprint or palm readers, one or more explosive detectors, one or more physical or facial recognition terminology, one or more electronic key locks, or one or more mechanical key locks, or any combination of two or more thereof. The security device 52A, 52C can also include a security measure, such as, but not limited to, posting an individual or guard 56 proximate to the barrier device 46A, 46C to check identification cards (e.g., photo identification cards, licenses, etc.). In one embodiment, the security device 52A may be located in the first space 50A1 and also in the second space 50A2 of the passing room 42A. Similarly, the security device 52C may be located in the first space 50C1 and also in the second space 50C2 of the passing room 42C. Security devices 52A, 52C can also be included inside or outside of the respective passing rooms 40A and 40C.

In one embodiment, each of the passing rooms 40A and 40C can comprise lighting. For example, lighting 54A can be provided in the first space 50A1 and/or the second space 50A2 of passing room 40A and lighting 54C can be provided in the first space 50C1 and/or in the second space 50C2 of the passing room 40C. Heat curtains can also be provided in the vicinity, for example above, any one of openings 14A1, 14A2, 14C1 and 14C1. In addition, as shown in FIG. 4, a cover material (e.g., an awning) 23 may also be provide in the vicinity, for example above, of any one of openings 14A1, 14A2, 14C1 and 14C1. In addition, a floor lining 25 may also be provided in the vicinity, for example at a foot, of any one of openings 14A1, 14A2, 14C1 and 14C2. The awning 23 can be a retractable sheet of flexible material or a removable panel or the like, or can be permanent. The floor lining 25 can be, for example, a non-skid rubber liner or grating, or the like.

As stated above, the portable container 10B is used as a control room. In one embodiment, a control room 40B is provided in the portable container 10B for housing one or more guards 56 or supervisors 57. The control room 40B can include a detection system 58. The detection system can be used to check items carried by individuals when passing through the passing rooms 40A and 40C. The detection system comprises a detection device 59 for scanning objects carried by the individuals. The detection system 58 can also comprise a conveyor 60 for transporting the objects into the detection device 58. In an embodiment of the invention, the detection devices can be an electromagnetic device (e.g., an x-ray machine) or a chemical device for detecting belongings of an individual (e.g., the inside contents of a bag carried by the individual) passing through the passing rooms 40A and 40C. However, any other sort of detection device can be employed. The detection system 58 can be placed near one of the openings 14B1 or 14B2 so as to allow an individual passing through one of the passing rooms 40A or 40C to place in or retrieve from the detection system 58 his/her belongings.

In one embodiment, the control room 40B can also include a control panel 45 to control the barrier device(s) 46A and/or 46C and the security device(s) 52A and/or 52C in order for the guard 56 or supervisor 57 to monitor the passing room 40A and/or 40C while staying in the control room 40B. The control panel 42 can comprise an alarm device 47 which gives an alarm in case a problem occurs in the passing room 40A and/or the passing room 40C.

The control room 40B is located between the passing rooms 40A and 40C. In this way the guard 56 and/or the supervisor 57 in control room 40C can observe the inside of the passing rooms 40A and 40C. The guard 56 and/or the supervisor 57 can take the appropriate action to address any situation that may occur in any of the passing room 40A, the passing room 40C and/or the control room 40B.

Similar to the passing rooms 40A and 40C, control room 40B can also comprise lighting 54B. For example, lighting 54B can be provided in three areas of the control room. Similarly, heat curtains can also be provided in the vicinity, for example above, of opening 14B1 and/or 14B2. In addition, as shown in FIG. 4, an awning 23 and or a floor lining may also be provided in the vicinity, for example above or at the foot of the opening 14B1 and/or 14B2.

One or more air conditioning units can be provided in the control device, for example, provided in any one of the passing rooms 40A and 40C and/or the control room 40B. The one or more air conditioning units can be installed, for example, on a roof of any one of the portable containers 10A, 10B and 10C. The control room can also be provided with various amenities and utilities such as the provision of one or more telephone jacks, one or more computer outlets, one or more cable outlets, one or more electrical outlets, or any combination of two or more thereof.

In an embodiment of the invention, as depicted in FIG. 5, one or more openings 15A, 15B can be provided in both containers 10A and 10B for communicating between the passing room 40A and control room 40B and in both containers 10B and 10C for communicating between the passing room 40C and the control room 40B. The openings 15A, 15B can be used as a handicap access to redirect handicapped or disabled individuals to pass through the control room 40B instead of one of the passing rooms 40A or 40C as a handicapped or disabled individual may have a difficulty passing through the barrier device 46A or the barrier device 46C or difficulty using (e.g., reaching, seeing, etc.) security device 52A or security device 52C.

The portable containers 10A, 10B or 10C can be put on a vehicle or trailer and transported or towed to reach a specific destination. By arranging the portable container in the manner described above, the portable containers 10A, 10B and 10C can be used to control access to an area. The portable containers 10A, 10B and 10C may be used in a setting where control of access to a specific area may be needed. For example, the specific area can be a work site where access of personnel to the work site can be controlled. A worker may carry an access device which when read by the security device may allow or deny access to the work site. The portable containers 10A, 10B and 10C may also be used by people that do not have an access device, but who must pass through security to enter a venue (e.g., an outside concert or the like).

If the portable containers 10A, 10B and 10C are being used in conjunction with an access device, when a person approaches the passing room 40A in portable container 10A from, for example, the second area 27 and enters through the opening 14A1, the person can stay in the first space 50A1 in the walkway 42A and present an access device (e.g., identification or electronically read card) to the security device 52A. In one embodiment, because the security device 52A is located inside the passing room 40A, the chance that the person will lose or break an identification card or device is decreased because the person does not need to expose the identification card or device outside of the portable container 10A.

In one embodiment, the barrier device 46A remains locked or closed until the access device is successfully read by the security device 52A. Once a person is approved by the security device 52A, the barrier device 46A is unlocked and the person can go through the barrier device 46A. If a person is not approved by the security device 54, the barrier device 46A continues to be kept locked, and the control panel 45 can give an alarm to the guard 56 and/or the supervisor 57 via the alarm device 47.

In one embodiment, in the case where an individual is coming from the second area 27 (e.g., a non-secure area) and intending to enter into the first area 26 (e.g., a secure area), the individual must pass through the passing room 40A or the passing room 40C by entering through opening 14A1 or opening 14C1. Before entering through, for example, the opening 14A1 of the passing room 40A in the portable container 10A, the individual may deposit his/her belongings at one end of conveyor 60 through the opening 14B1, to be scanned by the detection system 58. The opening 14B1 can be, for example, a window or trap door, or the like. While the individual presents an access device to the security device 52A and passes through the barrier device 46A, his/her belonging are being scanned by the detection system 58. Once the individual is in area 50A2, after passing through the barrier device 46A, the individual may pickup his/her belongings at an opposite end of the conveyor 60 and exit through the opening 14A2 to enter into the secured area 26.

In another embodiment, in the case where an individual is coming from the first area 26 (e.g., a non-secure area) and intending to enter into the second area 27 (e.g., a secure area), the individual must pass through the passing room 40A or the passing room 40C by entering through opening 14A2 or opening 14C2. After entering through, for example, the opening 14A2 of the passing room 40A in the portable container 10A, the individual being in area 50A2 may deposit his/her belongings at a table 61 to be screened by the one or more guards 56 or the one or more supervisors 57. If deemed necessary by the guards 56 or the supervisor 57, the belongings of the individual may be sent for scanning using detection system 58. In which case the belongings can be placed at one end of conveyor 60 to be guided into the detection device 59 for scanning. While the belongings of the individual are being scanned, the individual may present an access device to the security device 52A to pass the barrier device 46A. Once the individual has passed through the barrier device 46A and the individual is in area 50A1, the individual may exit through the opening 14A3 to enter into the secured area 27. The individual may then pickup his/her belongings at an other end of the conveyor 60 through opening 14B1.

If the portable container 10A is being used without an access device, when an individual approaches the passing room 40A from an area 26 (e.g., a non-secure area) and enters through opening 14A2, the individual can go through the security device 52A (e.g., a magnetometer). The individual enters area 50A2 in which the individual may be subject to additional screening. In one embodiment, the barrier device 46A can be the same device as the security device 52A (e.g., the metal detector). In another embodiment, a separate barrier device 46A can be used to stop persons from accessing the second area (e.g., a secure area) 27. The barrier device 46A remains locked or closed until the guard 56 or the supervisor 57 authorizes the individual to enter the secured area 27. Once an individual is approved, the barrier device 46A is unlocked and the individual can go through the barrier device 46A. If the individual is not approved, the barrier device 46A continues to be kept locked, and the control panel 45 in the control room 40B can give an alarm to the guard 56 and/or the supervisor 57 via the alarm device 47 and the guard 56 can instruct the individual to go back to non-secured area 26 or show additional credentials. Alternatively, the barrier device 46A can remain open until locked by the guard 56 or the supervisor 57.

Figure 7:
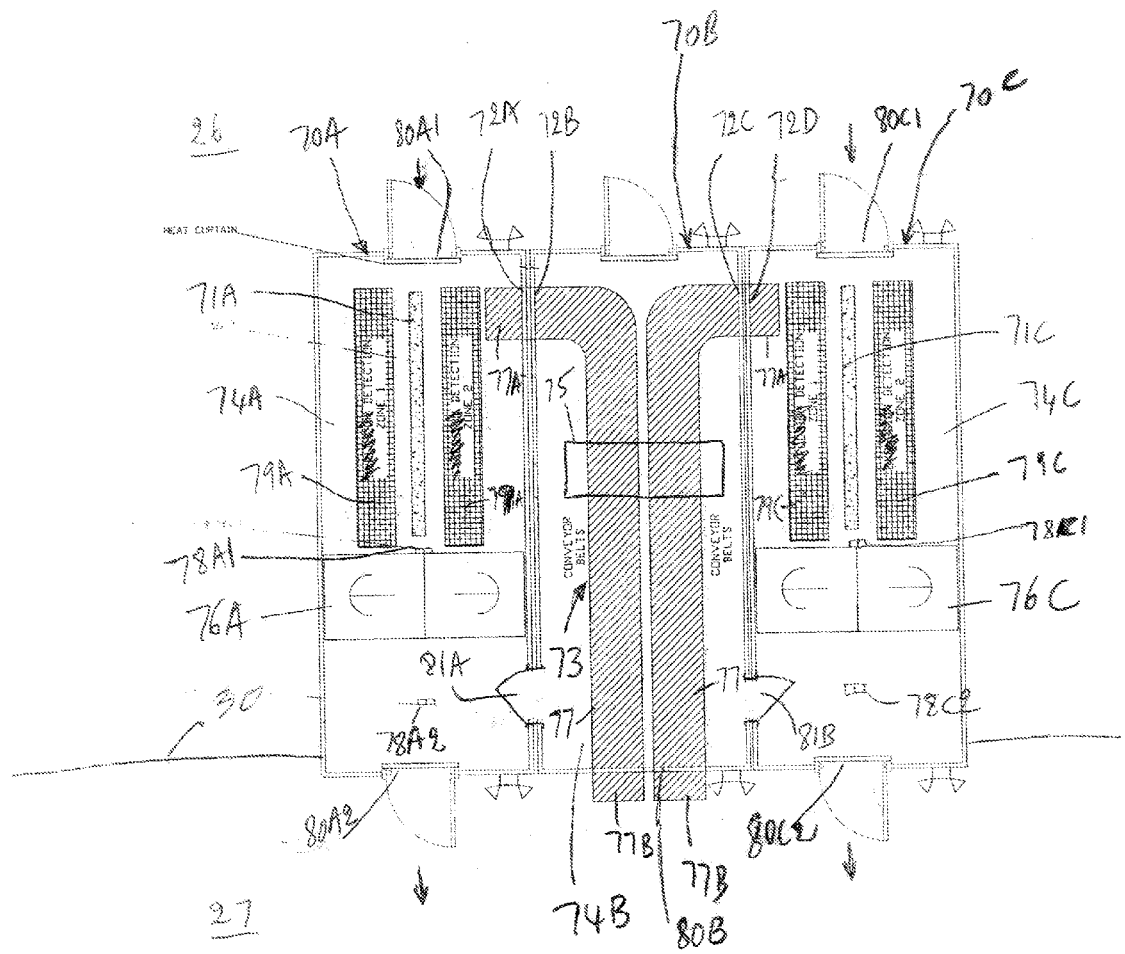
FIG. 7 is floor plan of an access control system, according to another embodiment of the present invention.

FIG. 7 is floor plan of the access control system, according to yet another embodiment of the present invention. Similarly to the embodiment depicted in FIG. 5, three portable containers 70A, 70B and 70C are juxtaposed next to each other. The portable containers 70A, 70B and 70C are arranged such that opening 72A in portable container 70A communicates with opening 72B in portable container 70B and opening 72C in portable container 70B communicates with opening 72D in portable container 70C.

Similar to the embodiment depicted in FIG. 5, the space in each of the portable containers 70A, 70B and 70C can be tailored for a specific need. In this embodiment, the spaces in the portable containers 70A and 70C can be used as passing rooms for individuals to access a second area (e.g., a secured area) 27 delimited by the fencing material 30 from a first area (e.g., non-secured area) 26. The space in portable container 70B can be used as a control room. The space in portable container 70B can be configured to house a detection system 73 for scanning belonging of individuals passing through the passing rooms of portable container 70A and 70C.

The containers 70A and 70C comprise passing rooms 74A and 74C, respectively. The passing rooms 74A and 74C control the movement of people between the first area (the non secured area) 26 and the second area (the secured area) 27. The passing rooms 74A and 74C can be similar in many aspects to the passing rooms 40A and 40B in portable containers 10A and 10B described in the previous paragraphs. The portable container 70A comprises entrance doorway 80A1 and exit doorway 80A2 and the portable container 70C comprises entrance doorway 80C1 and exit doorway 80C2 through which an individual enter from area (e.g., non secured area) 26 and exit into area (e.g., secured area) 27. The portable container 70A can comprise at least one barrier device 76A and the portable container 10C can comprise at least one barrier device 76C. The barrier device 76A can be arranged inside of the passing room 74A so as to restrict a person's movement through the passing room 7A. The barrier device 76C can be arranged inside of the passing room 74C so as to restrict a person's movement through the passing room 74C. In one embodiment, a turnstile (e.g., a full-body turnstile, a partial-body turnstile, a bi-directional turnstile, or a uni-directional turnstile) is employed as a barrier device 76A, 76C of the portable containers 70A, 70B, respectively. However, other barrier devices may be used to restrict a person's movement through the passing room 74A, 74C. For example, a sliding door, a revolving door, moving bars, and gates, or the like may be used as a barrier device 76A, 76C.

In one embodiment, the passing room 74A, 74C can include one or more security devices 78A1, 78A2, 78C1, 78C2 issuing permission for a person to pass through doorway 80A2, 80C2, respectively. In one embodiment, the security device 78A1, 78A2, 78C1, 78C2 can comprise, but is not limited to, one or more card readers, one or more metal detectors (such as a magnetometer or the like), one or more weapon detectors, one or more x-ray scanners, one or more radiofrequency scanners (e.g., shortwave scanners), one or more biometric readers, one or more iris scanners, one or more fingerprint or palm readers, one or more physical or facial recognition terminology, one or more electronic key locks, or one or more mechanical key locks, or any combination of two or more thereof. The security device 78A1, 78A2, 78C1, 78C2 can also include a security measure, such as, but not limited to, posting an individual or guard proximate to the doorway 80A1 and/or 80A2, 80C1 and/or 80C2 to check identification cards (e.g., photo identification cards, licenses, etc.). In one embodiment, the security device 78A2 may be located in the space between the barrier 76A and the exit doorway 80A2 and the security device 78A1 located in the space between the entrance doorway 80A1 and the barrier device 76A. Similarly, the security device 78C2 may be located in the space between the barrier 76C and the exit doorway 80C2 and the security device 78C1 can be located in the space between the entrance doorway 80C1 and the barrier device 76C.

The passing room 74A, 74C can also include one or more explosive and/or weapon detection device 79A, 79C, respectively. Alternatively, any sorts of detection devices may be employed. The one or more explosive and/or weapon detection device may be located, for example, in the space between the entrance doorway 80A1 and the barrier device 76A in the passing room 74A and in the space between the entrance doorway 80C1 and the barrier device 76C in the passing room 74C. However, the one or more explosive and/or weapon detection device 79A, 79C may also be located in the space between the barrier device 76A and the exit doorway 80A2 and may also be located in the space between the barrier device 76C and the exit doorway 80C2 in the passing room 74C. The one or more (for example two) explosive and/or weapon detection devices 79A in passing room 74A can be separated by a wall 71A and/or the one or more (for example two) explosive and/or weapon detection devices 79C in passing room 74C can be separated by a wall 71C. The walls 71A and 71C can be provided to separate the one or more explosion detection zones 79A, 79C so as to increase the number of individuals processed through the respective passing rooms 74A and 74C.

As stated above, the portable container 70B can be used as a control room. In one embodiment, a control room 74B is provided in the portable container 70B for housing one or more detection systems 73. The detection system 73 can be used to check items carried by individuals when passing through the passing rooms 74A and 74C. The detection system 73 comprises one or more detection devices 75 for scanning objects carried by the individuals. The detection system 73 can also comprise one or more conveyors 77 for transporting the objects into and out of the detection device 75. In an embodiment of the invention, the detection device 75 can be an electromagnetic device (e.g., an x-ray machine) for detecting belongings of an individual (e.g., the inside contents of a bag carried by the individual) passing through the passing rooms 74A and 74C, a chemical detection device or any other kind of detector. In one embodiment, the conveyor 77 can be configured as an L-shape. A first end 77A of the L-shaped conveyor 77 can be positioned in the passing room 74A so as to allow individuals to place their belongings for scanning. A second end 77B of the L-shaped conveyor 77 can be positioned outside the control room 74B in the area 27. The L-shaped conveyor can thus guide the belongings placed at the first end 77A through the detection device 75 and through an opening 80B in the portable container 70B before reaching the second end 77B where the individual can pick up the scanned belongings.

The control room 74B is located between the passing rooms 74A and 74C. One or more guards can be posted in the control room 74B to monitor the detection system 73, observe the inside of the passing rooms 74A and 74C and/or manually scan the belongings of the individuals passing through the passing rooms 74A and 74B. The one or more guards can take appropriate action to address any situation that may occur in any of the passing room 74A, the passing room 74C and/or the control room 74B.

Similar to the embodiment depicted in FIG. 5, as illustrated in FIG. 7, one or more openings 81A, 81B can be provided in both containers 70A and 70B for communicating between the passing room 74A and control room 74B and provided in both containers 70B and 70C for communicating between the passing room 74C and the control room 74B. The openings 81A, 81B can be used as a handicap access to redirect handicapped or disabled individuals to pass through the control room 74B instead of one of the passing rooms 74A or 74C as a handicapped or disabled individual may have a difficulty passing through the barrier device 76A or the barrier device 76C or difficulty using (e.g., reaching, seeing, etc.) security device 78A2 or security device 78C2.

Similar to the portable containers 10A, 10B and 10C, the portable containers 70A, 70B or 70C can be put on a vehicle or trailer and transported or towed to reach a specific destination. By arranging the portable container in the manner described above, the portable containers 70A, 70B and 70C can be used to control access to an area. The portable containers 70A, 70B and 70C may be used in a setting where control of access to a specific area may be needed. For example, the specific area can be a work site where access of personnel to the work site can be controlled. A worker may carry an access device which when read by a security device may allow or deny access to the work site. The portable containers 70A, 70B and 70C may also be used by individuals that do not have an access device, but who must pass through security to enter a venue (e.g., an outside concert or the like).

For example, in the case where an individual is coming from the first area 26 (in this case the non-secured area) and intending to enter into the second area 27 (in this case the secured area), the individual must pass through the passing room 74A or the passing room 74C by entering through doorway 80A1 or 80C1. After entering through, for example, the opening 80A1 of the passing room 74A in the portable container 70A, the individual may deposit his/her belongings at the first end 77A of the conveyor 77 to be guided to the detection device 75 for scanning. While the belongings of the individual are being scanned by the detection device 75, the individual may be scanned for presence of explosives or weapons with the explosive/weapons detection device 79A. After being scanned for explosives and/or weapons, the individual may submit to a scan by the security device 78A1 (for example an iris scan device or a finger scan device or the like) to pass the barrier device 76A. Once the individual has passed through the barrier device 76A, the individual may be required to present an access device to the security device 78A2 (e.g., a card swipe device or the like) to exit through the doorway 80A2 to enter into the secured area 27. After exiting through the doorway 80A2, the individual may then pickup his/her belongings at the second end 77B of the conveyor 77.

Figure 8:
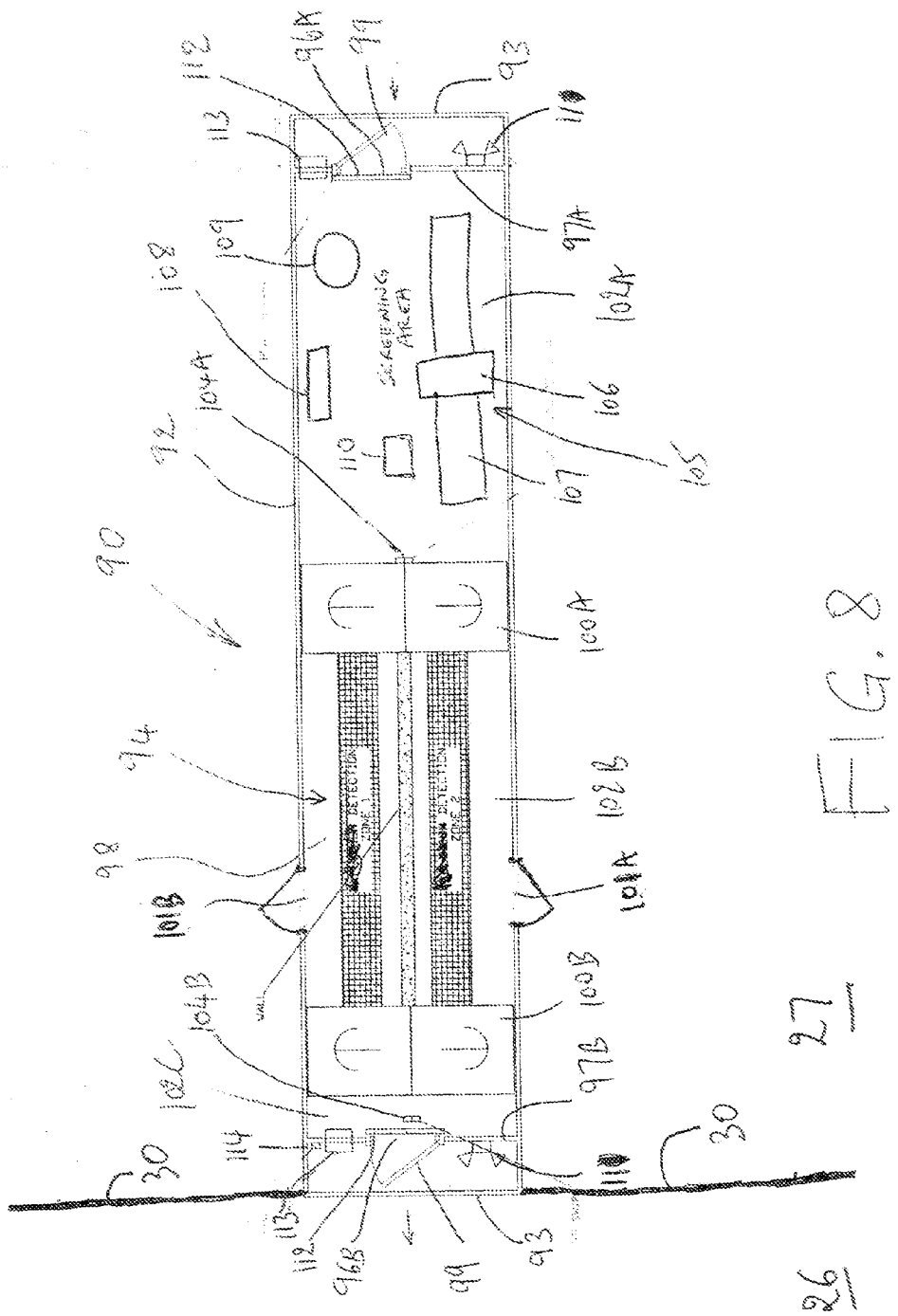
FIG. 8 is floor plan view of an access control device, according to yet another embodiment of the present invention.

FIG. 8 is floor plan view of an access control device using a portable container, according to yet another embodiment of the present invention. The portable container 90 has a housing 92, which, in one embodiment, is rectangular shaped. The portable container 90 can have same general characteristics as container 10 described in the above paragraphs. For example the portable container can be a standard shipping container which complies with international standards as determined by the International Organization for Standardization (ISO).

The portable container 90 comprises passing room 94. The passing room 94 control the movement of people between a first area (for example the secured area) 26 and a second area (for example the non-secured area) 27. The first area 26 and the second area 27 are separated by a fence or barrier 30. The barrier 30 can be, for example, attached to sidewalls of the portable container 90. The passing room 94 communicates with the second area (non-secured area) 27 via a first opening 96A and communicates with the first area (the secured area) 26 via a second opening 96B. The first opening 96A is spaced apart from the second opening 96B, in the passing room 94, so as to define a walkway 98 in-between. A closing device 99 (e.g., a door, shutters or the like) may be employed to close the openings 96A and 96B. A security sensing device for safeguarding the closing device 99 can be employed. In one embodiment, the first and second openings 96A and 96B are provided inside the portable container 90. For example, the first and second openings 96A and 96B can be provided in respective walls 97A and 97B which are constructed inside the portable container 90. The walls 97A and 97B can be recessed relative to opening 93 of the portable container 90. The opening 93 of the portable container 90 can be closed, for example, with an already existing door in the portable container 90. Indeed, the portable container 90 may originally be provided with one or more doors on each opposite side of the container. In this way, the recessed closing device 99 provided on recessed wails 97A and 97B and any associated security sensing device can be, for example, isolated from outside environmental elements when the portable container 90 is not in use. In addition, as shown in FIG. 8, the portable container is not provided with any external openings other than opening 93 which can be closed with doors. By closing the doors in the opening 93, the portable container 90 being closed on ail sides, can be viewed from the outside as a regular shipping container as the internal structure of the portable container 90 is hidden from outside view. This feature provides additional security for the structure as well as other components inside the container when the portable container is not in use. In addition, by enclosing all the components of the access control device inside the container, the access control device can be handled as a regular portable container, for example, during shipping.

The portable container 90 can comprise at least one barrier device. In one embodiment, the portable container 90 comprises two barrier devices 100A and 100B. The barrier devices 100A, 100B can be arranged inside of the passing room 94 so as to restrict a person's movement through the passing room 94. In one embodiment, a turnstile (e.g., a full-body turnstile, a partial-body turnstile, a bi-directional turnstile, or a uni-directional turnstile) is employed as barrier devices 100A and 100B. However, other types of barrier devices may be used to restrict a person's movement through the passing room 94. For example, a sliding door, a revolving door, moving bars, and gates, or the like may be used as the barrier devices 100A and 100B. The barrier devices 100A and 100B are located inside the walkway 98 and partition the walkway 98 into a first, a second and third spaces 102A, 102B and 102C. The first space 102A is defined as a space between the barrier device 100A and the first opening 96A. The second space 102B is defined as a space between the barrier device 100A and the barrier device 100B. The third space is defined as a space between the barrier device 100B and the second opening 96B.

In one embodiment, the first space 102A is used as a screening area, the second space 102B is used a detection zone for explosives, weapons, metal, drugs and/or other materials, and the third space 102C is used as an intermediary area before accessing the second area (e.g., the secured area) 26.

In one embodiment, the passing room 94 can include one or more security devices 104A, 104B issuing permission for a person to pass through the passing room 94. In one embodiment, the security devices 104A, 104B can comprise, but is not limited to, one or more card readers, one or more metal detectors (such as a magnetometer or the like), one or more weapon detectors, one or more x-ray scanners, one or more radiofrequency scanners (e.g., shortwave scanners), one or more biometric readers, one or more iris scanners, one or more fingerprint or palm readers, one or more explosive detectors, one or more physical or facial recognition terminology, one or more electronic key locks, or one or more mechanical key locks, or any combination of two or more thereof. The security device 104A, 104B can also include a security measure, such as, but not limited to, posting an individual or guard 56 proximate to the barrier devices 100A, 100B to cheek identification cards (e.g., photo identification cards, licenses, etc.). In one embodiment, the security device 104A may be located in the first space 102A and the security device 104B may be located in the third space 102C of the passing room 94. However, alternatively or additionally, security devices 104A, 104B can also be provided in the space between the opening 93 of the portable container and the respective opening 96A and 96B provided inside the portable container.

In one embodiment, the passing room 94 can comprise various amenities such as lighting, water, air conditioning, etc. For example, interior lighting 110 can be provided in the first space 102A, the second space 102B and/or the third space 102C. In addition, flood lighting 111 can also be provided outside the passing room 94 to illuminate the exterior of the passing room 98. Furthermore, heat curtains 112 can also be provided in the vicinity, for example above, any one of openings 96A and 96B. One or more air conditioning units 113 can also be provided to control the temperature inside the passing room 94. Electrical power can be provided via power connection 114 so as to operate various electrical amenities and other electrical powered systems in the passing room 94.

As stated above, the first space 102A is used as a screening area, the second space 102B is used a detection zone and the third space is used as an intermediary area before accessing the second area (e.g., the secured area) 26. The screening area can, for example, include detection system 105 for scanning items carried by individuals when passing through passing room 94. In one embodiment, the detection system 105 can comprise a detection device 106 for scanning objects carried by the individuals and a conveyor 107 for transporting the objects into the detection device 106. In an embodiment of the invention, the detection device 106 can be an electromagnetic device (e.g., an x-ray machine) for detecting belongings of an individual (e.g., the inside contents of a bag carried by the individual) passing through the passing room 94, a chemical detector and/or any other kind of detector.

In one embodiment, the first space (screening area) 102A can also include a control panel 108 to control the barrier device(s) 100A and/or 100B and the security device(s) 104A and/or 104B in order for a guard 109 to monitor the passing room 94 while staying in the first space (screening area) 102A. The control panel 108 can comprise an alarm device which gives an alarm in case a problem occurs in the passing room 94.

The portable container 90 can be used to control access of personnel to the a work site. A worker may carry an access device which when read by the security device may allow or deny access to the work site. Alternatively, other uses are possible.

In operation, when an individual approaches the passing room 94 in portable container 90 from, for example, the second area 27 and enters through the opening 96A, the individual can stay in the first, space 102A in the walkway 98 and present an access device (e.g., identification or electronically read card) to the security device 104A. Prior to presenting the access device to the security device 104A, the individual places his/her belongings on the conveyor 107 to be scanned by the detection device 106. After scanning of the belongings of the individual, the individual can pick up his/her belongings and can proceed and present the access device to the security device 104A.

The barrier device 100A remains locked or closed until the access device is successfully read by the security device 104A. Once the individual is approved by the security device 104A, the barrier device 100A is unlocked and the individual can go through the barrier device 100A to enter into second space (detection area) 102B. If a person is not approved by the security device 104A, the barrier device 100A remains locked, and the control panel 108 can give an alarm to the guard 109.

Once the individual is in the second space (detection area) 102B, the individual is scanned for explosives, weapons, metal, drugs or the like, using a detection device such as, but not limited to, a magnetometer or the like. If a trace of contraband is detected on the individual, the control panel 108 can give an alarm to the guard 109 and shuts both barrier devices 100A and 100B. In this way the second space between the barrier devices 100A and 100B can function as a "trap" that traps the individual on which a trace of contraband is detected in the second space between the two shut barrier devices 100A and 100B. If a trace of contraband is detected on the individual and the individual is trapped in the second space 102B, the individual may be released through one or more doorways or emergency exits 101A or 101B for a more detailed screening and evaluation by additional guards upon summoned by guard 109. In this way, a flow of individuals through the first space 102A and the second space 102B may not be interrupted. If the individual does not carry any contraband, the barrier device 100B can be opened and the individual can proceed to exit from the second space (detection area) 102B via barrier device 100B to enter into the third space 102C. In one embodiment, the barrier devices 100A and 100B are uni-directional turnstiles. Therefore, when the individual is in the detection area 102B, the individual can only exit through the barrier device 100B and the individual cannot exit through the barrier device 100A as this barrier device is only activated in one direction (entry direction). When the individual is in the third space 102C, the individual can present the access device to the security device 104B. The security device 104B controls the opening or closing of the closing device 99 (e.g., a door, shutters or the like) that is employed to close the openings 96B. The closing device 99 of opening 96B remains closed until the access device is successfully read by the security device 104B. Once the identity of the individual is confirmed by the security device 104B, the closing device 99 is unlocked and the individual can go through the opening 96B to enter into the first area (secured area) 26.

In one embodiment, two or more standard shipping containers are filled with material to be shipped at a first location. Then, the two or more containers are shipped to a second location. The two or more containers are next unloaded at the second location. Next, the two or more containers are configured as an access control system after the two or more containers are unloaded. In one embodiment, a first container in the two or more containers is outfitted to function as a passing room while a second container in the two or more containers is placed adjacent the first container and is outfitted to function as a control room. In one embodiment, the second location can be overseas from the first embodiment.

Figure 9:
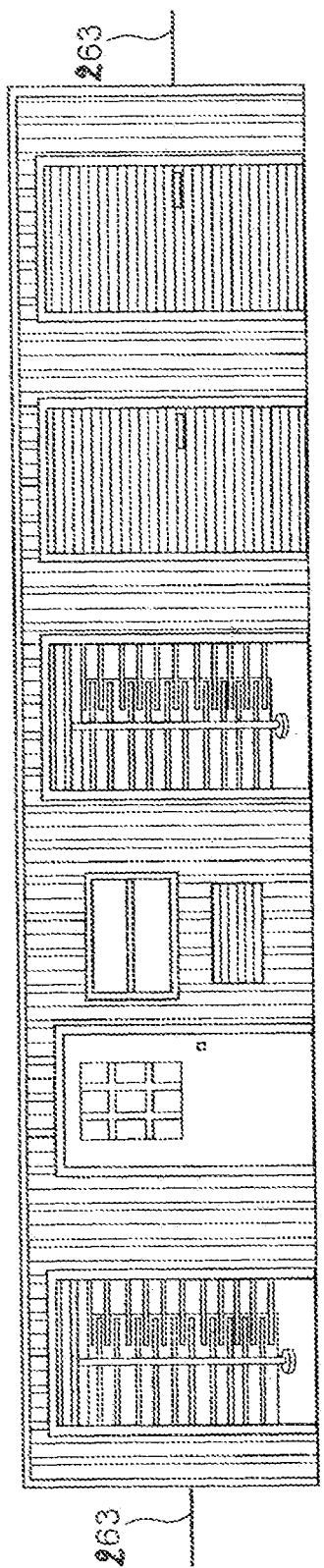
FIGS. 9 and 10 illustrate a front view and a perspective view of a portable container, according to embodiments of the invention.
Figure 10:
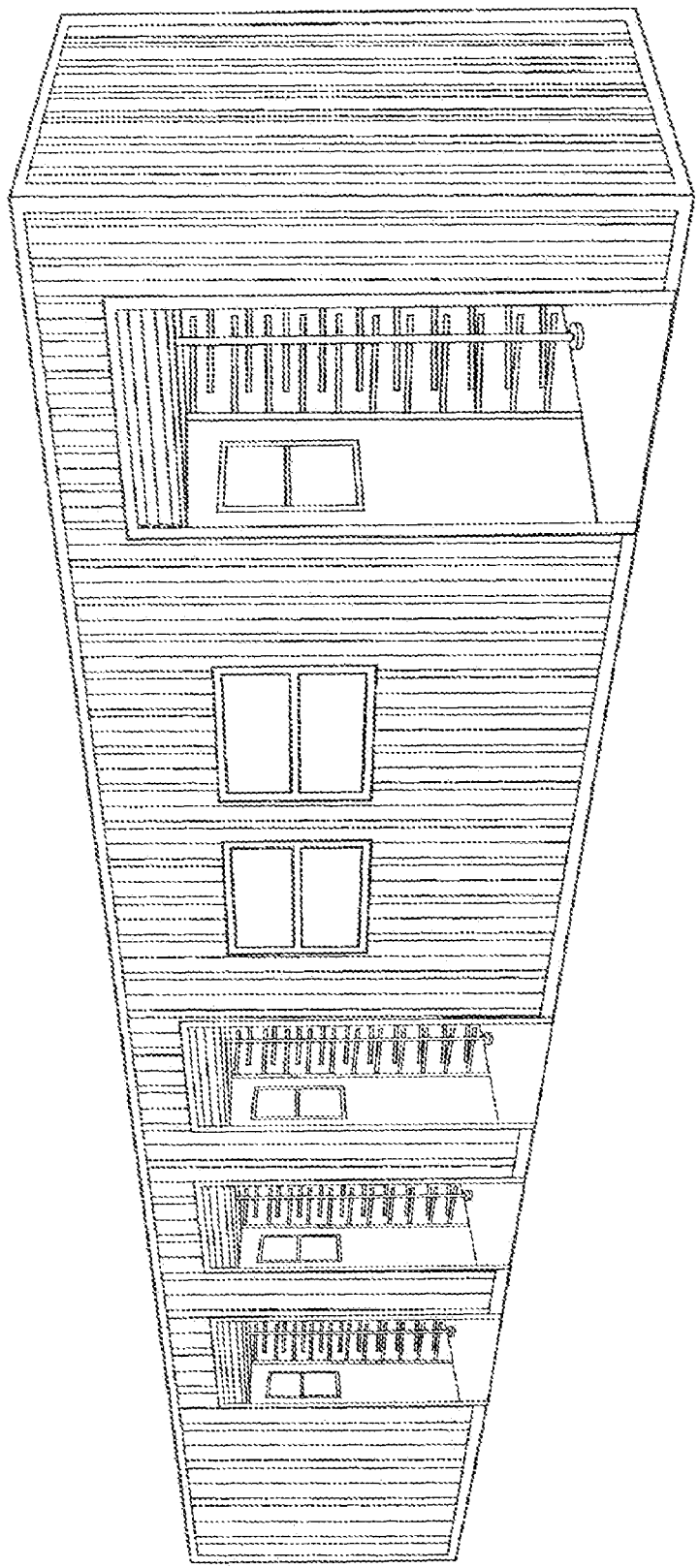

FIGS. 9 and 10 illustrate a front view and a perspective view of a portable container 210, according to embodiments of the invention. The portable container 210 has housing 220, which, in one embodiment, is rectangular shaped. However, any other shape is also possible. The housing 220 can be made of a durable material (e.g., iron, stainless steel), enabling the portable container 210 to be securely towed by a vehicle. One or both ends of the portable container 210 can be equipped to be towed by a vehicle. In addition, a security system to ensure that only authorized vehicles move the portable container 210 can also be included. Furthermore, fencing 263 or other material may be attached to the portable container 210 to surround a secured area 262 (e.g., see FIG. 13).

Figure 11:
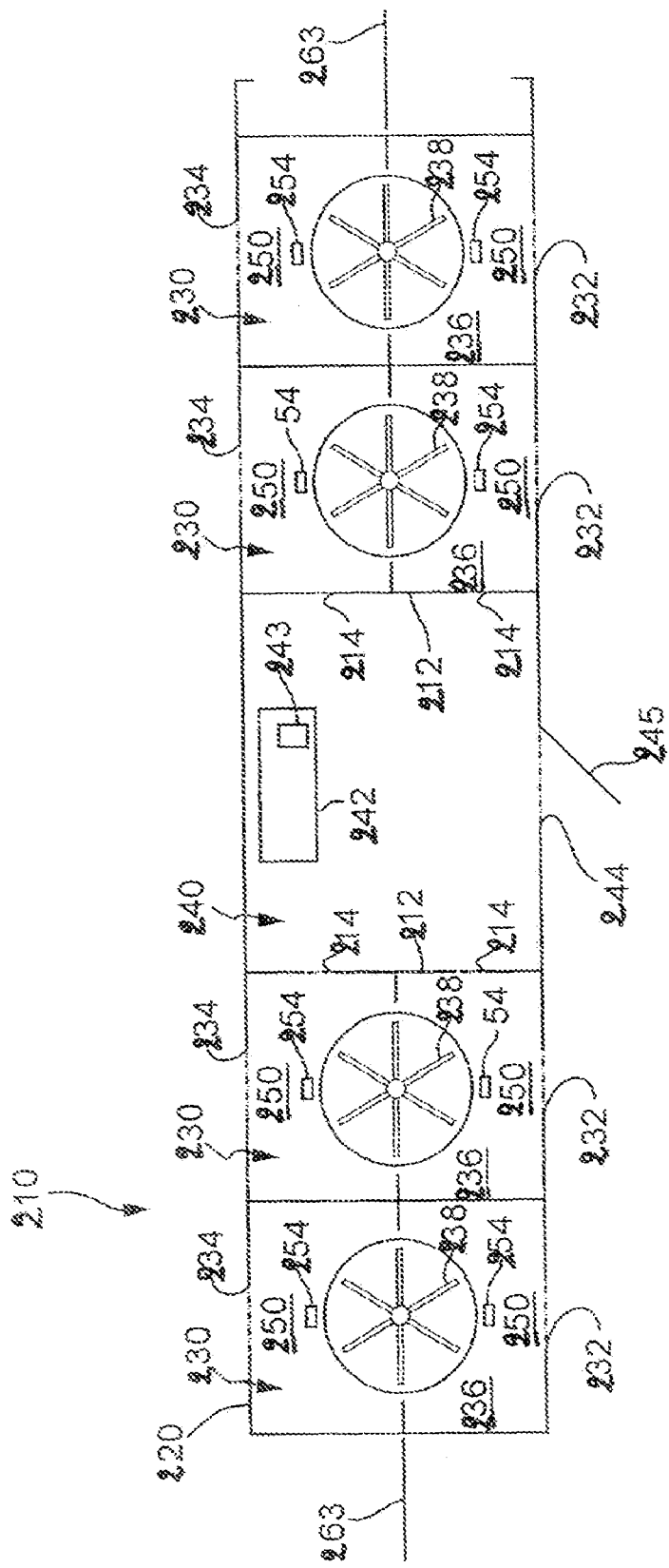
FIG. 11 illustrates a top cross-sectional view of the portable container, according to one embodiment of the invention.

FIG. 11 illustrates a top cross-sectional view of the portable container 210, according to one embodiment of the invention. The portable container 210 comprises at least one passing room 230, which is provided for controlling and directing the movement of people between two areas. In addition, the portable container 210 can also comprise at least one control room 240, for housing a guard or supervisor.

The portable container 210 can be a standard shipping container. In one embodiment, the standard shipping container can be a shipping container which complies with international standards as determined by the International Organization for Standardization (ISO). In one embodiment, the shipping container can include the following features: made from corrugated steel; heavy steel framed to withstand repeated lifting and placing; able to hold a cargo as large as 30 tons; marine grade plywood flooring; lockable accessible doors on one or both sides of the shipping container; forklift pockets; corner connectors; or a venting system; or any combination thereof.

In one embodiment, the portable container 210 can be delivered to a user in a ready-made or turn-key state. In this case, if electricity is not required, the portable container 210 is ready to be used. If electricity is required, all that needs to be done to render the portable container 210 usable is the provision of electricity. In another embodiment, the portable container can be customized by the user to meet specific needs of the user.

Figure 12:
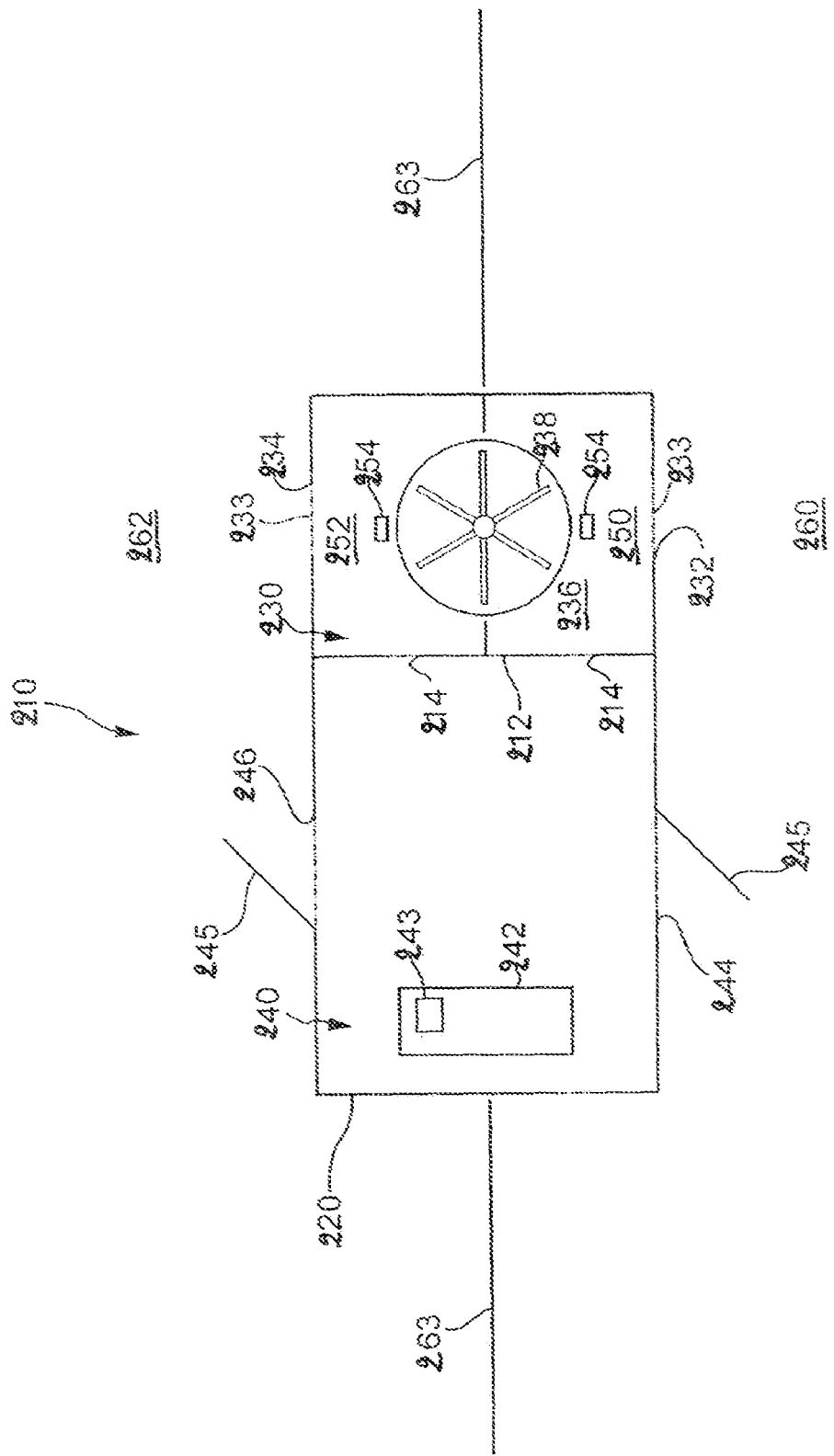
FIG. 12 is a detailed top cross-sectional view of a passing room and a control room, according to one embodiment of the invention.

FIG. 12 is a detailed top cross-sectional view of a passing room 230 and a control room 240, according to one embodiment of the invention. The passing room 230 controls the movement of people between area 260 and another area 262. A fence 263 can also be used to separate areas 260 and 262 in locations where the portable containers 210 are not used. The passing room 230 has at least a first opening 232, and at least a second opening 234, which in one embodiment is on a side opposite the first opening 232. However, the first opening 232, second opening 234, and additional openings can be located on any side of the passing room 230, including being located on the same side of the passing room 230. The second opening 234 is spaced apart from the first opening 232 so as to define a walkway 236 in-between. A closing device 233 (e.g., a door, shutters) is employed to close the openings 232 and 234 when passing room 230 is not in use. A security sensing device for safeguarding the closing device 233 can be employed.

The portable container 210 can comprise at least one barrier device 238 in the inside of the passing room 230, which restricts a person's movement through the passing room 230. In one embodiment, a turnstile (e.g., a full-body turnstile, a partial-body turnstile, a bi-directional turnstile, or a uni-directional turnstile) is employed as a barrier device of the portable container 210, but other barrier device may be used to restrict a person's movement through the passing room 230. For example, a sliding door, a revolving door, moving bars, and gates may be used as a barrier device. The barrier device 238 is located inside the walkway 236, defining a first space 250 between the barrier device 238 and the first opening 232, and defining a second space 252 between the barrier device 238 and the second opening 234.

In one embodiment, the passing room 230 can alternatively include at least one security device 254 issuing permission for a person to pass through the passing room 230. In one embodiment, the security device 254 can comprise, but is not limited to, one or more card readers, metal detectors, biometric readers, iris scanners, fingerprint or palm readers, explosive and/or weapon detectors, physical or facial recognition terminology, electronic key locks, or mechanical key locks, or any combination thereof. The security device 254 can also include a security measure, such as, but not limited to, posting an individual proximate to the barrier device 238 to check identification cards (e.g., photo identification cards, licenses).

In one embodiment, a security device 254 is located in the first space 250 and also in the second space 252. Security devices 254 can be included inside or outside of the passing room. The passing room 230 can also comprise lighting.

In one embodiment, a control room 240 is provided for housing a guard or supervisor. The control room 240 can include a control panel 242 to control the barrier device(s) 238 and the security device(s) 254 in order for a guard or supervisor to monitor the passing room while staying in the control room 240. The control panel 242 can comprise an alarm device 243 which gives an alarm in case a problem occurs in the passing room 230.

The control room 240 and the passing room 230 are separated by at least one wall 212. The wall 212 can comprise at least one window 214, so that a guard in the control room 240 can observe the inside of the passing room 230 or the outside of the portable container 210. The control room 240 has at least one opening 244 with at least one closing device 245. The closing device(s) 245 of the control room 240 can be the same as, or different from, the closing device(s) 233 of the passing room 230.

The control room 240 can also comprise: heat and/or air-conditioning; lighting; at least one computer/cable outlet; at least one phone jack; at least one electrical outlet; at least one vent; or insulation; or any combination thereof.

FIG. 13 illustrates a perspective view of a passing room 230 and a control room 240, according to one embodiment of the invention. As the portable container 210 has a housing 220 which comprises both the at least one passing room 230 and the at least one control room 240, it is easy for users to move and use almost anywhere. The portable container has everything that a user needs to control access to an area.

The portable container 210 can be put on a vehicle or trailer and transported or towed to reach multiple destinations, and can be used to control access to an area. The portable container may be used by people who have an access device (e.g., people working on a construction site). The access device is read by the security device. The portable container 210 may also be used by people that do not have an access device, but who must pass through security to enter a venue (e.g., an outside concert).

If the portable container 210 is being used in conjunction with an access device, when a person approaches the passing room 230 from an area 260 and enters the first opening 232, the person can stay in the first space 250 in the walkway 236 and present an access device (e.g., identification or electronically read card) to the security device 254. In one embodiment, because the security device 254 is located inside the passing room, the chance that the person will lose or break an identification card or device is decreased because the person does not need to expose the identification card or device outside of the portable container 210. The portable container 210 also protects the security device 254, because the security device 254 is located inside of the passing room 230.

In one embodiment, the barrier device remains locked or closed until the access device is successfully read by the security device 254. Once a person is approved by the security device 254, the barrier device 238 is unlocked and the person can go through the barrier device 238. If a person is not approved by the security device 254, the barrier device 238 continues to be kept locked, and the control panel 242 can give an alarm to a guard via the alarm device 243.

If the portable container 210 is being used without an access device, when a person approaches the passing room 230 from an area 260 and enters the first opening 232, the person can stay in the first space 250 in the walkway 236 and go through the security device 254 (e.g., a metal detector). In one embodiment, the barrier device 238 can be the same device as the security device 254 (e.g., the metal detector). In another embodiment, a separate barrier device can be used to stop persons from, accessing the secured area 262. The barrier device 238 remains locked or closed until the security device 254 or security personnel authorizes a person to enter the secured area 262. Once a person is approved, the barrier device 238 is unlocked and the person can go through the barrier device 238. If a person is not approved, the barrier device 238 continues to be kept locked, and, the control panel 242 can give an alarm to a guard via the alarm device 243. Alternatively, the barrier device can remain open until locked by security personnel, for example.

In one embodiment, a standard shipping container is filled with material to be shipped at a first location. Then, the container is shipped to a second location. The container is next unloaded at the second location. Next, the container is outfitted as an access control unit after the container is unloaded. In one embodiment, the second location can be overseas from the first embodiment.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures, which highlight the functionality and benefits of the present invention, are presented for example purposes only. The architecture of the present invention is sufficiently flexible and configurable, such that, it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. An access control system, comprising:
at least first and second portable containers, the first portable container comprising two shorter sidewalls and two longer sidewalls and at least one sidewall opening in at least one of the longer sidewalls extending to a floor of the first portable container and having a size sufficiently large to walk through, and the second portable container comprising at least one sidewall opening extending to a floor of the second portable container and having a size sufficiently large to walk through, the portable containers being arranged such that at least one sidewall opening of the first portable container communicates with at least one sidewall opening in the second portable container when the first and second portable containers are positioned next to each other, wherein the first container or the second container or both comprise at least one panel configured to close at least one sidewall opening provided in the first container or the second container or both, the at least one panel including a bar-like locking mechanism pivotably attached to the at least one panel, the bar-like locking mechanism having extremities which selectively engage a sidewall adjacent to the at least one sidewall opening to hold the at least one panel over the at least one sidewall opening,
wherein the first portable container comprises a passing room disposed in the first portable container, the passing room having a first passing room opening, a second passing room opening and a walkway in-between, the first passing room opening and the second passing room opening being on opposite shorter sideswalls of the first portable container; and the access control system further comprises
a barrier device located in the walkway of the passing room, defining a first space between the first passing room opening and the barrier device, and a second space between the barrier device and the second passing room opening,
wherein the access control system is constructed such that when the access control system is disposed between a first area, adjacent the first passing room opening, and an enclosed second area, adjacent the second passing room opening, ingress and egress from and to the second area is controlled by the barrier device.

2. The access control system of claim 1, further comprising at least one security device providing authorization for an individual to enter into the second area.

3. The access control system of claim 2, wherein the at least one security device includes one or more card readers, one or more metal detectors, one or more biometric readers, one or more iris scanners, one or more fingerprint readers, one or more facial recognition terminology, one or more explosive detectors, one or more weapon detectors, one or more electronic key locks, or one or more mechanical key locks, or a combination of two or more thereof.

4. The access control system of claim 2, wherein the at least one security device is located in the first space, the second space or both.

5. The access control system of claim 2, wherein the at least one security device is located outside the passing room.

6. The access control system of claim 1, wherein the barrier device includes a turnstile, a sliding door, a revolving door, or moving bars or a combination thereof.

7. The access control system of claim 1, further comprising a fence at least partly forming the enclosure of the second area, wherein the fence is attached or adjacent to an outside surface of the first portable container and/or to an outside surface of the second portable container.

8. The access control system of claim 1, wherein the second portable container comprises a control room adjacent to the passing room.

9. The access control system of claim 8, wherein the control room comprises a control panel to control the barrier device in order for a guard and/or a supervisor to monitor the passing room while staying in the control room.

10. The access control system of claim 9, wherein the control panel comprises an alarm device which gives an alarm in case a problem occurs in the passing room.

11. The access control system of claim 8, wherein the control room comprises a detecting system for scanning belongings of individuals passing through the passing room.

12. The access control system of claim 11, wherein the detecting system comprises a detecting device and a conveyor in communication with the detecting device, the conveyor configured and arranged to direct the belongings to the detecting device.

13. The access control system of claim 12, wherein the detecting device is an electromagnetic detecting machine, a chemical detecting machine or a combination thereof.

14. The access control system of claim 13, wherein the electromagnetic detecting machine is an x-ray machine.

15. The access control system of claim 1, wherein the at least one panel comprises a plurality of panel sections joined together using a joining material.

16. The access control system of claim 1, further comprising a movable center lock, wherein the movable center lock is configured to attach the bar-like locking mechanism to the at least one panel.

17. The access control system of claim 1, further comprising one or more anchoring device configured to attach the first portable container to the second portable container.

18. The access control system of claim 17, wherein the anchoring device comprises a plurality of links and a ratcheting device linked to the plurality of links.

19. The access control system of claim 18, wherein the plurality of links are configured to be fastened to a sidewall of the first portable container and the second portable container.

20. The access control system of claim 18, wherein the ratcheting device comprises one or more levers which when pivoted back and forth allow the ratcheting device to bring the plurality of links closer to each other.

21. The access control system of claim 1, wherein the first portable container or the second container or both is delivered in a turnkey state.

22. The access control system of claim 1, wherein features of the first portable container or the second container or both are customizable to meet specific needs of a user.

23. The access control system of claim 1, further comprises a cover material disposed above the first passing room opening, the second passing room opening, or both.

24. The access control system of claim 23, wherein the cover material is a retractable sheet of flexible material or a removable panel or the like.

25. The access control system of claim 1, further comprising a floor lining material disposed in a vicinity of a foot of the first passing room opening, the second passing room opening, or both.

26. The access control system of claim 25, wherein the floor lining material is a non-skid rubber liner or the like.

27. The access control system of claim 1, further comprising one or more air conditioning units, the one or more air conditioning units being disposed in the passing room, the control room or both.

28. The access control system of claim 27, wherein the one or more air conditioning units on a roof of the first portable container, on a roof of the second portable container or both.

* * * * *

UNITED STATES PATENT AND TRADEMARK OFFICE
CERTIFICATE OF CORRECTION

| | | |
|---|---|---|
| PATENT NO. | : 7,823,338 B2 | Page 1 of 1 |
| APPLICATION NO. | : 11/733464 | |
| DATED | : November 2, 2010 | |
| INVENTOR(S) | : David Slagel and Robert Slagel | |

It is certified that error appears in the above-identified patent and that said Letters Patent is hereby corrected as shown below:

Column 1, line 29, change "snows" to --shows--

Column 1, line 32, after "is" insert --a--

Column 1, line 39, after "is" insert --a--

Column 1, line 41, after "is" insert --a--

Column 3, line 26, change "die" to --the--

Column 3, line 63, change "device" to --devices--

Column 4, line 7, change "lire" to --The--

Column 8, line 56, after "is" insert --a--

Column 13, line 19, after "used" insert --as--

Signed and Sealed this
Fourth Day of October, 2011

David J. Kappos
*Director of the United States Patent and Trademark Office*